US009053097B2

(12) United States Patent
Zivkovic

(10) Patent No.: US 9,053,097 B2
(45) Date of Patent: Jun. 9, 2015

(54) CROSS-LANGUAGE COMMUNICATION BETWEEN PROXIMATE MOBILE DEVICES

(75) Inventor: Aleksandar Zivkovic, North York (CA)

(73) Assignee: Ortsbo, Inc., Toronto, Ontario (CA)

( * ) Notice: Subject to any disclaimer, the term of this patent is extended or adjusted under 35 U.S.C. 154(b) by 242 days.

(21) Appl. No.: 13/464,172

(22) Filed: May 4, 2012

(65) Prior Publication Data

US 2012/0284014 A1    Nov. 8, 2012

Related U.S. Application Data

(60) Provisional application No. 61/482,958, filed on May 5, 2011.

(51) Int. Cl.
    *G06F 17/28*      (2006.01)

(52) U.S. Cl.
     CPC ..................... *G06F 17/289* (2013.01)

(58) Field of Classification Search
     CPC ... G06F 17/289; G06F 17/28; G06F 17/2809; G06F 17/2818; G06F 17/2827; G06F 17/2836; G06F 17/2845; G06F 17/2854; G06F 17/2863; G06F 17/2872; G06F 17/2881
     USPC ...................................................... 704/9, 2–8
     See application file for complete search history.

(56) References Cited

U.S. PATENT DOCUMENTS

| | | | |
|---|---|---|---|
| 4,706,212 A | 11/1987 | Toma | 364/900 |
| 5,497,319 A | 3/1996 | Chong et al. | 364/419.02 |
| 6,047,252 A | 4/2000 | Kumano et al. | 704/2 |
| 6,119,078 A | 9/2000 | Kobayakawa et al. | 704/3 |
| 6,161,082 A | 12/2000 | Goldberg et al. | 704/3 |
| 6,865,716 B1 | 3/2005 | Thurston | 715/536 |
| 7,310,676 B2 * | 12/2007 | Bourne | 709/227 |
| 7,643,985 B2 | 1/2010 | Horvitz | 704/2 |
| 7,788,590 B2 | 8/2010 | Taboada et al. | 715/761 |
| 7,849,144 B2 | 12/2010 | Prajapat et al. | 709/206 |
| 8,045,054 B2 | 10/2011 | Bishop et al. | 348/468 |

(Continued)

OTHER PUBLICATIONS

Trapani, Gina, "Google SMS translation and currency conversion," product review, http://lifehacker.com/137564/google-sms-translation-and-currency-conversion, 1 page, Nov. 16, 2005.

(Continued)

*Primary Examiner* — Lamont Spooner
(74) *Attorney, Agent, or Firm* — Sunstein Kann Murphy & Timbers LLP

(57) ABSTRACT

A system facilitates cross-language communication among users of respective wireless communication devices. Two or more mutually-agreeing users establish and participate in a cross-language communication session, without revealing private information, such as their telephone numbers. Once the session has been established, each user enters text into her wireless communication device, and a translated version of the entered text is displayed on a screen of the other user's wireless communication device. The text may be entered, such as by typing on a keyboard on the wireless communication device or by speaking inputs into a microphone and automatically recognizing the speech. Optionally, the translated text may be spoken by a speech synthesizer. No permanent information about the participants need be stored in the respective wireless communication devices, so once the communication session ends, no further communication between or among the participants is possible, without establishing another session, thereby preserving each user's privacy.

40 Claims, 5 Drawing Sheets

(56) References Cited

U.S. PATENT DOCUMENTS

| | | | |
|---|---|---|---|
| 8,155,121 B2* | 4/2012 | Gudan et al. | 370/392 |
| 8,275,602 B2* | 9/2012 | Curry et al. | 704/3 |
| 8,660,244 B2* | 2/2014 | Blagsvedt et al. | 379/88.25 |
| 2002/0091509 A1 | 7/2002 | Zoarez et al. | 704/6 |
| 2002/0123878 A1 | 9/2002 | Menke | 704/2 |
| 2002/0173965 A1 | 11/2002 | Curry et al. | 704/275 |
| 2003/0125927 A1 | 7/2003 | Seme | 704/3 |
| 2005/0261890 A1 | 11/2005 | Robinson | 704/9 |
| 2006/0256959 A1* | 11/2006 | Hymes | 379/433.04 |
| 2007/0004451 A1* | 1/2007 | Anderson | 455/556.1 |
| 2007/0075131 A1* | 4/2007 | Alberth et al. | 235/380 |
| 2007/0168450 A1 | 7/2007 | Prajapat et al. | 709/207 |
| 2007/0208813 A1 | 9/2007 | Blagsvedt et al. | 709/206 |
| 2007/0239424 A1 | 10/2007 | Payn | 704/3 |
| 2007/0255554 A1 | 11/2007 | Cai | 704/9 |
| 2007/0287484 A1 | 12/2007 | Chava et al. | 455/466 |
| 2009/0125295 A1 | 5/2009 | Drewes | 704/3 |
| 2009/0231281 A1 | 9/2009 | Whytock et al. | 345/168 |
| 2009/0305729 A1* | 12/2009 | Bennett | 455/466 |
| 2010/0030549 A1* | 2/2010 | Lee et al. | 704/4 |
| 2012/0215843 A1* | 8/2012 | Maskey et al. | 709/204 |

OTHER PUBLICATIONS

"New SMS Translation Service Launched," Intercultural Communication and Translation News, http://www.kwintessential.co.uk/cross-cultural/intercultural-communication-translation, 2 pages, Mar. 13, 2008.

Watkins, Chas, "SMS text translation and live interpreters arrives on your cell phone with mobile.lingtastic.com," PR Log-Global Press Release Distribution, 2 pages, Jun. 27, 2008.

"Products," Interlecta, http://home.interlecta.com/products, 2 pages, 2010.

"SMS translator," Inventorium, http://inventorium.pbworks.com/w/page/27085638/SMS%20translator, 1 page, Jun. 15, 2010.

"Lingo 2 Word Translation," http://www.lingo2word.com/translate.php, 1 page, Dec. 17, 2010.

"Send an SMS Text Message in a foreign language," SMS Translation Service, http://www.kwintessential.co.uk/smstranslation-service/index.php , 1 page, Dec. 26, 2010.

Rehman, Zayed, SMS Speaker Translating Product Review; "Translate and Listen to Incoming Text Message (SMS) on Android," 3 pages, Mar. 17, 2011.

Free Online Email Translation Service, http://web.archive.org/web/20110519191146/http://www.kwintessential.co.uk/translation/fre . . . , 1 page, May 19, 2011.

International Searching Authority, International Search Report and the Written Opinion for International Application No. PCT/US2012/036500, 10 pages, Nov. 23, 2012.

Menke, Laura, "An XSLT style sheet and an XML dictionary approach to internationalization", IBM, http://www.ibm.com/developerworks/xml/library/wa-xslt/, 5 pages, Apr. 1, 2001.

"Your personal Internet translator", Systran Language Translation Technologies, http://www.systranet.com/Systran/net, 1 page, May 9, 2005.

"WinDi Browser 'on the fly' Translation Assistant", http://www.windi7.com/wbrowser.htm, WinDi Translation Help, WinDi Dictionaries, 3 pages, May 9, 2005.

Mann Perez, "Google Translate for Android getting conversation mode," XP55036182, Retrieved from the internet: URL:http://www.intomobile.com/2011/01/12/google-translate-android-app/[retrieved on Aug. 23, 2012], 7 pages, Jan. 12, 2011.

International Searching Authority, International Search Report—International Application No. PCT/US2012/036228 together with the Written Opinion of the International Searching Authority, 22 pages, dated Oct. 12, 2012.

* cited by examiner

CROSS-LANGUAGE COMMUNICATION BETWEEN PROXIMATE MOBILE DEVICES

CROSS REFERENCE TO RELATED APPLICATIONS

This application claims the benefit of U.S. Provisional Patent Application No. 61/482,958, filed May 5, 2011, titled "System for enabling cross-language communication between mobile devices that are in proximity to each other," the entire contents of which are hereby incorporated by reference herein, for all purposes.

TECHNICAL FIELD

The present invention relates to natural language translation devices and method and, more particularly, to such devices and methods that facilitate cross-language communication among users of respective wireless communication devices.

BACKGROUND ART

Users of wireless mobile communication devices often find themselves in situations where they would like to communicate with other people in their immediate vicinity, but they are prevented from doing so by a language barrier. That is, the users do not speak or understand a language spoken by the people near them. This situation is common when people travel outside their native countries or sometimes even within their own countries.

Systems that translate text into other languages are known. For example, Google SMS (short message service) translation and currency conversion service translates text sent to a particular SMS address and returns translated text to the sender.

Some application programs designed for execution by smart phones also provide translation services. For example, the SMS Speaker Translating application for Android mobile telephones translates incoming SMS messages and, using a synthetic voice, speaks the translated messages. Lingtastic announced a service named mobile.lingtastic.com, which translates and delivers SMS messages to other users' devices. Kwintessential's SMS Translation Service also allows users to send SMS messages to other user and have the messages translated before display on the recipients' devices.

Google has demonstrated a conversation mode of Google Translate for Android mobile telephones. This product includes speech recognition, translation and speech synthesis. Inputs and outputs are handled by a single mobile device. However, spoken conversations suffer from privacy issues in public places and are difficult to conduct in noisy environments.

While some of these and other prior art systems translate text messages, the user of such a system must show translated text displayed (in the case of Google SMS translation service) on the user's device to a person with whom the user wishes to communicate or, if the other person has a mobile device, the user must know the other person's mobile device address or telephone number to take advantage of an SMS message translation and forwarding service, such as mobile.lingtastic.com. Most people are, however, reluctant to disclose their mobile devices' addresses or telephone numbers to complete strangers. Thus, prior art systems for translating text have limited utility.

SUMMARY OF EMBODIMENTS

An embodiment of the present invention provides a computer-implemented method for facilitating cross-language communication among users of respective wireless communication devices. The method includes receiving a first user input at a first of the wireless communication devices. The first user input indicates willingness to participate in a cross-language communication session with a second of the wireless communication devices. The method also includes receiving a second user input at the second wireless communication device. The second user input indicates willingness to participate in the cross-language communication session with the first wireless communication device. After receiving the first and second user inputs, the method includes receiving a first user message entered on the first wireless communication device in a first natural language. A translated first user message is automatically generated, including translating the first user message into a second natural language, different than the first natural language. The translated first user message is output on the second wireless communication device.

As part of the cross-language communication session, after outputting the translated first user message on the second wireless communication device, a second user message may be entered on the second wireless communication device and the second user message may be received. A translated second user message may be automatically generated, including translating the second user message into the first natural language. The translated second user message may be output on the first wireless communication device.

During the cross-language communication session, subsequent first user messages may be entered on the first wireless communication device, and the subsequent first user messages may be received. For each subsequent first user message, a corresponding translated first user message may be automatically generated, including translating the subsequent first user message into the second natural language. The corresponding translated first user message may be output on the second wireless communication device. In addition, subsequent second user messages may be entered on the second wireless communication device, and the subsequent second user messages may be received. For each subsequent second user message, a corresponding translated second user message may be automatically generated, including translating the subsequent second user message into the first natural language. The corresponding translated second user message may be output on the first wireless communication device.

Automatically generating the translated first user message may include translating the first user message into the second natural language within the first wireless communication device or within the second wireless communication device or within a server, distinct from the first and second wireless communication devices. Automatically generating the translated first user message may include sending a request to the server to translate the first user message receiving, from the server, a translation of the first user message into the second natural language.

Receiving the first user input may include receiving text characters entered upon a keyboard of the first wireless communication device. Optionally or alternatively, receiving the first user input may include receiving an audio signal corresponding to an utterance and automatically recognizing the utterance.

Optionally, before receiving the first and second user inputs indicating willingness to participate in the cross-language communication session, the method may include receiving, by the first or second wireless communication device, a user input identifying the first natural language. Responsive to receiving the user input identifying the first natural language, the method may include storing an indication of the first natural language. The indication may be stored by the first and/or second wireless communication device.

Optionally, the first user message or the translated first user message may be wirelessly communicated from the first wireless communication device directly to the second wireless communication device. Here, "directly" means a wireless signal travels from the first wireless communication device directly to the second wireless communication device, not via an intermediate device, i.e., not via a server, cellular tower, repeater, wireless switch or router, etc.

Optionally, the first user message or the translated first user message may be wirelessly communicated from the first wireless communication device to the second wireless communication device via a wireless communication network, such as a cellular telephone network, short message service (SMS) network, wireless computer network, etc. In this case, the translated first user message is generated within the first or second wireless communication device.

Optionally, the method may include automatically coordinating establishment of the cross-language communication session by a server, distinct from, and wirelessly communicatively coupled to, the first and second wireless communication devices. In this case, information about the first and second user inputs indicating willingness to participate in the cross-language communication session may be received at the server, and the first wireless communication device may be automatically associated with the second wireless communication device.

Associating the first with the second wireless communication device may include automatically selecting the first and second wireless communication devices from among a plurality of wireless communication devices. The selection may be based on a criterion that involves the first and second wireless communication devices. For example, the criterion may include physical proximity of the first wireless communication device to the second wireless communication device or distance between the first and second wireless communication devices being less than a threshold value. The threshold value may be automatically calculated, based on a number of wireless communication devices physically proximate the first wireless communication device. Here, "based" means based at least in part, not necessarily based entirely on.

The criterion may include similarity of at least a portion of respective network addresses of the first and second wireless communication devices.

The criterion may include proximity in time of receipt of the first and second user inputs indicating willingness to participate in a cross-language communication session, proximity in time of receipt by the server of respective messages from the first and second wireless communication devices or similarity of respective physical properties measured by the respective first and second wireless communication devices. The criterion may include similarity of sounds received by the respective first and second wireless communication devices or similarity of images captured by the respective first and second wireless communication devices.

Optionally, the method may include receiving a first user input including information about the second wireless communication device. The input may be received at the first wireless communication device. In this case, associating the first with the second wireless communication device may include associating the first with the second wireless communication device, based on the received information about the second wireless communication device.

Automatically generating the translated first user message may include translating the first user message into the second natural language by the server.

The first user input indicating willingness to participate in a cross-language communication session may include a button press or data indicating orientation of the first wireless communication device or data indicating acceleration of the first wireless communication device. A "user input" may include accelerometer and clock inputs indicating the first and second wireless devices are bumped together or tilted similarly or in a complementary fashion.

Optionally, the method may include receiving, at the first wireless communication device, a first user input instruction and, responsive to receipt of the first user input instruction, ending the cross-language communication session. Optionally or alternatively, the method may include automatically ending the cross-language communication session, based on a criterion that involves physical proximity of the first wireless communication device to the second wireless communication device.

The method may include wirelessly communicating the first user message or the translated first user message from the first wireless communication device, via a wireless communication network, to the second wireless communication device, without translating the first user message into the second natural language en route.

The method may include wirelessly communicating the first user message or the translated first user message from the first wireless communication device, via a wireless communication network, and generating the translated first user message may occur within the first or second wireless communication device.

Another embodiment of the present invention provides a system for facilitating cross-language communication among users of respective wireless communication devices. The system may include first and second wireless communication devices. Each wireless communication device includes a respective first user interface configured to receive a respective user input indicating willingness to participate in a cross-language communication session with the other wireless communication device. The indication may, but need not, identify a user of the first wireless communication device. Similarly, the indication may, but need not, identify the second wireless communication device or a user of the second wireless communication device. Each wireless communication device includes a second user interface configured to receive a respective user message, after receipt of the user inputs indicating willingness to participate in the cross-language communication session. Each wireless communication device includes a third user interface configured to output a respective translated user message. The system also includes a first automatic translation module configured to generate the translated user message by translating the user message received by the first wireless communication device from a first natural language to a second natural language. The system also includes a first transmitter module configured to wirelessly send the user message received by the first wireless communication device or the translated user message, from the first wireless communication device to the second wireless communication device.

Optionally, the system includes a second automatic translation module and a second transmitter module. The second automatic translation module is configured to generate, as part of the cross-language communication session, a second translated user message by translating the user message received by the second wireless communication device to the first natural language. The second transmitter module is configured to wirelessly send, from the second wireless communication device to the first wireless communication device, the user message received by the second wireless communication device or the second translated user message. The first and second transmitter modules may be implemented by separate component. Optionally, the first and second transmitter modules may be implemented by a single component. For example, if a server or wireless communication network is involved, a single component may, but need not, implement both the first and second transmitter modules. Similarly, the first and second translation modules can, but need not, be implemented by a common component, even though different first and second natural languages are used.

The first or second wireless communication device may include the first automatic translation module. The system may include a server, distinct from the first and second wireless communication devices, that includes the first automatic translation module.

Each second user interface may include a keyboard of the respective wireless communication device. Each second user interface may include a microphone, and the system may include an automatic speech recognizer configured to convert an audio signal from the microphone to corresponding text of the respective user message.

The first or second wireless communication device may include a fourth user interface configured to receive an identification of the first natural language. The wireless communication device may include a memory configured to store an indication of the first natural language.

The first transmitter module may be configured to send the user message received by the first wireless communication device or the translated user message directly to the second wireless communication device or via a wireless communication network. In the latter case, the first or second wireless communication device includes the first automatic translation module.

Yet another embodiment of the present invention provides a system for facilitating cross-language communication among users of respective first and second wireless communication devices. The system includes a server configured to automatically coordinate establishment of a cross-language communication session including the first and second wireless communication devices. The server includes a session initiation receiver and a coordination module. The session initiation receiver is configured to receive information about first and second user inputs, received by the respective first and second wireless communication devices. The first and second user inputs indicate willingness to participate in the cross-language communication session. The coordination module is configured to automatically associate the first wireless communication device with the second wireless communication device.

The coordination module may be configured to select the first and second wireless communication devices from among a plurality of wireless communication devices to associate the first wireless communication device with the second wireless communication device. The selection may be based on a criterion that involves the first and second wireless communication devices. The criterion may include physical proximity of the first wireless communication device to the second wireless communication device. The criterion may include distance between the first and second wireless communication devices being less than a threshold value. The coordination module may be configured to automatically calculate the threshold value, based on a number of wireless communication devices physically proximate the first wireless communication device. The criterion may include similarity of at least a portion of respective network addresses of the first and second wireless communication devices. The criterion may include proximity in time of receipt of the first and second user inputs indicating willingness to participate in a cross-language communication session. The criterion may include proximity in time of receipt by the server of respective messages from the first and second wireless communication devices. The criterion may include similarity of sounds received by the respective first and second wireless communication devices or similarity of images captured by the respective first and second wireless communication devices or similarity of respective physical properties measured by the respective first and second wireless communication devices.

The coordination module may be configured to automatically associate the first wireless communication device with the second wireless communication device, based on information about the second wireless communication device. The information about the second wireless communication device may be received at the first wireless communication device.

The server may include a translation module configured to automatically generate a translated first user message, including translating a first user message from a first natural language into a second natural language.

The first user input indicating willingness to participate in the cross-language communication session may include a button press or data indicating orientation of the first wireless communication device or data indicating acceleration of the first wireless communication device.

The server may be configured to automatically end the cross-language communication session, based on a criterion that involves physical proximity of the first wireless communication device to the second wireless communication device.

An embodiment of the present invention provides a computer program product for facilitating cross-language communication among users of respective wireless communication devices. The computer program product includes a non-transitory computer-readable medium having computer readable program code stored thereon. The computer readable program code is configured to receive, at a first of the wireless communication devices, a first user input indicating willingness to participate in a cross-language communication session with a second of the wireless communication devices. The computer readable program code is also configured to receive, at the second wireless communication device, a second user input indicating willingness to participate in the cross-language communication session with the first wireless communication device. After receiving the first and second user inputs, the computer readable program code is configured to receive a first user message entered on the first wireless communication device in a first natural language and automatically generate a translated first user message, including translating the first user message into a second natural language, different than the first natural language. The computer readable program code is also configured to output the translated first user message on the second wireless communication device.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

In accordance with embodiments of the present invention, computer-implemented methods and apparatus, as well as software-containing computer-readable media, are disclosed for facilitating cross-language communication among users of respective wireless communication devices. These embodiments enable two or more mutually-agreeing users to establish and participate in a cross-language communication session, without revealing private information, such as their telephone numbers. Once the session has been established, each user enters text into her wireless communication device, and a translated version of the entered text is displayed on a screen of the other user's wireless communication device. The text may be entered, such as by typing on a keyboard on the wireless communication device or by speaking inputs into a microphone and automatically recognizing the speech. Optionally, the translated text may be spoken by a speech synthesizer. No permanent information about the participants need be stored in the respective wireless communication devices, so once the communication session ends, no further communication between or among the participants is possible, without establishing another session, thereby preserving each user's privacy.

Figure 1:
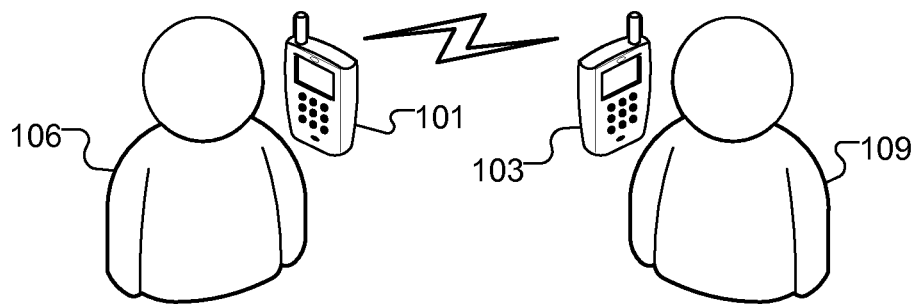
FIG. 1 is a schematic block diagram of direct wireless communication between devices, according to an embodiment of the present invention.

As illustrated schematically in FIG. 1, in some embodiments, the wireless communication occurs directly between wireless devices 101 and 103 of the respective users 106 and 109. "Directly" means a wireless communication signal travels from a sending device, such as device 101, to a receiving device, such as device 103, without traveling through an intermediate device, such as a repeater, mobile telephone cell tower, server, etc. (not shown). The wireless communication may be implemented via radio frequency (RF) transceivers, infrared (IR) transceivers, ultrasonic transceivers or any other suitable wireless transceivers. Bluetooth transceivers provide an exemplary direct wireless communication path between the wireless communication devices 101 and 103. Although, in the interest of simplicity of explanation, only two users 106 and 109 and two wireless communication devices 101 and 103 are shown in FIG. 1 and in other drawings, two or more such users and devices may participate in this and other embodiments described herein.

Figure 2:
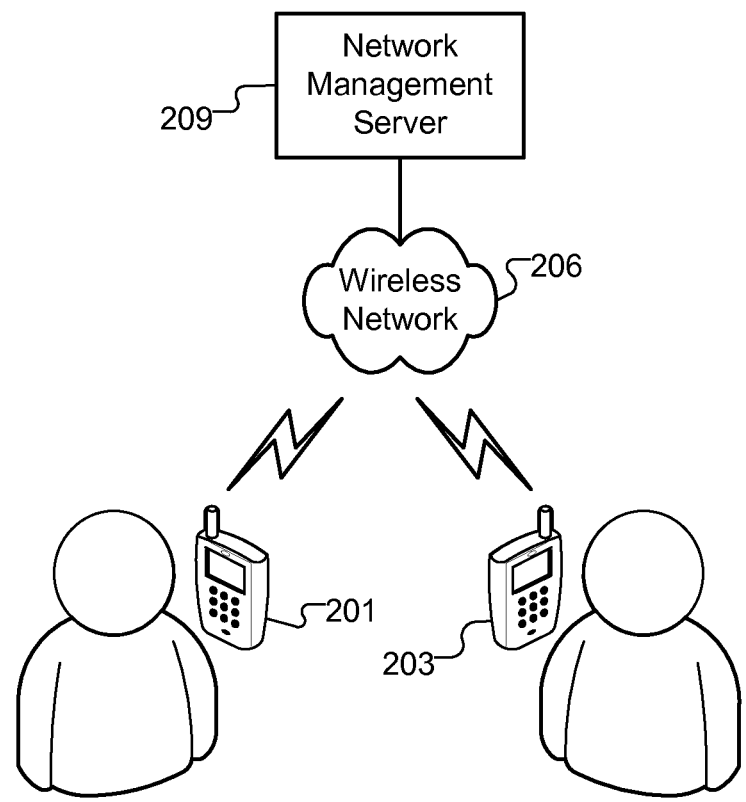
FIG. 2 is a schematic block diagram of indirect wireless communication between devices, according to an embodiment of the present invention.

In some other embodiments, exemplified schematically in FIG. 2, the wireless communication devices 201 and 203 communicate indirectly, i.e., via a wireless communication network 206, such as a cellular telephone network, an SMS network, a wireless computer network or the like, rather than directly. A server 209 may be used to manage the wireless communication network 206. The management server 209 is distinct from each of the wireless communication devices 201 and 203.

Figure 3:
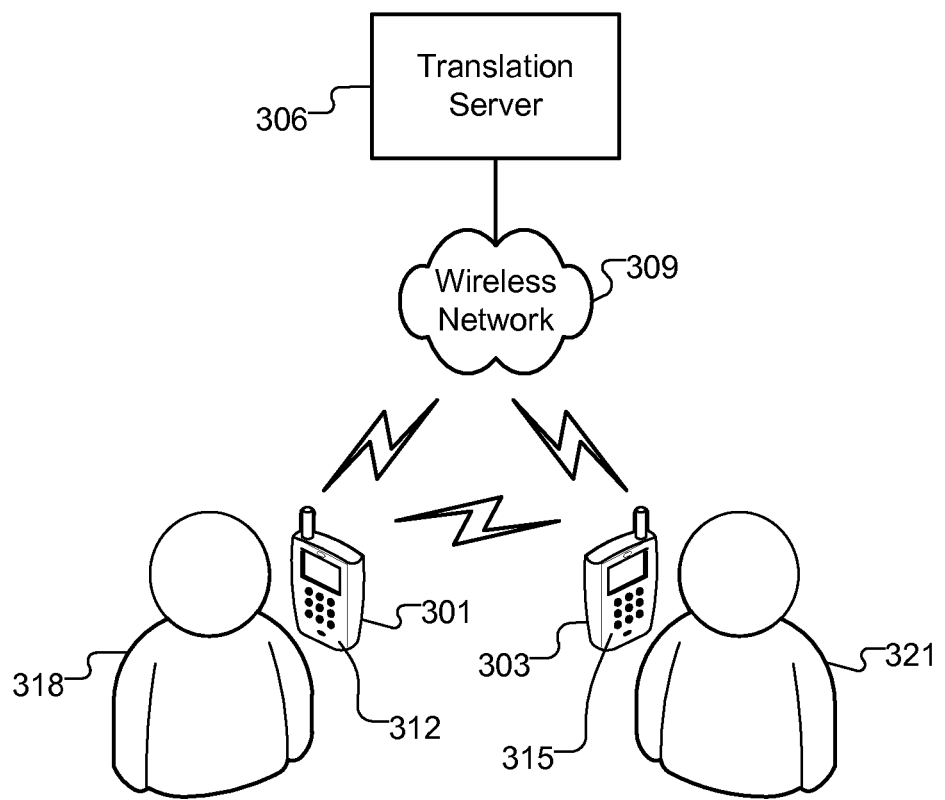
FIG. 3 is a schematic block diagram of a wireless cross-language communication session, according to an embodiment of the present invention.

In yet other embodiments, exemplified schematically in FIG. 3, although the wireless communication devices 301 and 203 communicate directly with each other, one or both of the wireless communication devices 301 and/or 303 also wirelessly communicates with a translation server 306 via a wireless network 309. The translation server 306 is distinct from each of the wireless communication devices 301 and 303. In some embodiments, the translation server 306, or a separate server (not shown), is instrumental in establishing a cross-language communication session between the wireless communication devices 301 and 303, as described below.

Other embodiments (not shown) involve other combinations of direct or indirect wireless communication between the wireless communication devices and presence or absence of a remote translation server and/or a wireless network management server.

Typically, each of the wireless communication devices 301 and 303 (using FIG. 3 as an example) has an application program 312 or 315 installed therein, and a processor in the wireless communication device 301 or 303 executes instructions of the application program to perform some or all of the functions described herein. Similarly, any server includes a processor executing instructions stored in a memory to perform functions attributed to the server.

The application program 312 and 315 may be installed in any suitable manner, such as from an external memory device, such as a memory stick, or downloaded from a web site or an "application store," such as a store operated by a wireless communication service provider. The application program 312 or 315 may interact with the user 318 or 321 via a display screen, touch screen, real or virtual keyboard, microphone, speaker and/or other input/output devices of the wireless communication device 301 or 303, as is well known in the art.

The user 318 or 321 of each wireless device 301 or 303 may configure her respective application program 312 or 315 via a suitable user interface. This configuration may include the user 318 or 321 identifying the user's preferred language, such as French, German, Hebrew or English, i.e., the language in which the user 318 or 321 prefers text from others to be translated into for outputting to the user. The user interface may facilitate identification by the user 318 or 321 of her preferred language by displaying national flags or other suitable icons for available languages and prompting the use 318 or 321 to select one of the icons. The application program 312 or 315 stores an indication of the user's preferred language, such as in a memory of the wireless communication device 301 or 303 or in a remote server 306, as discussed in more detail below. The user 318 or 321 may identify the preferred language before or after a cross-language communication session is initiated.

As noted, an application program 301 or 315 needs to be executed by each of the wireless communication devices that are to participate in a cross-language communication session. If a user 318 wishes to use the system to converse with another user 321, but the other user's wireless communication device 303 does not have the application program 315 installed thereon, the first user 318 may urge the other user 321 to download, install and run the application program 315, such as by gesturing, demonstrating or miming the process of installing and running the application program, etc. For example, the first user 318 might show the application program's initial user interface or a Quick Response Code (QR code) mixed bar code, displayed on her wireless communication device 301, to the other user 321 and point to the other user's wireless communication device 303. The other use 321 may use a camera in her wireless communication device 303 to invoke the QR code, which may be configured to cause the application program to be downloaded to the other user's wireless communication device 303.

Even if both wireless devices 301 and 303 have the application program 301 and 303 installed, before the system translates any text, a cross-language communication session needs to be established between the two wireless communication devices 301 and 303. Establishment of the session may involve a separate server 306, or the application programs 312 and 315 may establish the session without assistance from a separate server.

Session initiation involves both users 318 and 321 performing actions with or on their respective devices 301 and 303. For example, both users 318 and 321 may launch their respective application programs 312 and 315, or both users 318 and 321 may invoke "Start" buttons displayed by the application programs' user interfaces. In some embodiments, the actions by both users 318 and 321 need to be performed within a predetermined amount of time, such as 0.5 seconds or 30 seconds, to initiate the session. In the case of line-of-sight communication technologies, such as IR communication directly between the wireless devices 301 and 303, the users 318 and 321 may initiate a session by pointing their devices 301 and 303 at each other and activating the IR beams. These and other user actions provide user inputs into the wireless communication devices 301 and 303 indicating willingness to participate in the cross-language communication session.

If a remote server 306 is involved in establishing the cross-language communication session, and the server 306 handles or potentially handles many other wireless communication devices (not shown), it may be necessary to provide the server 306 with information about the wireless communication devices 301 and 303 that are to participate in a particular cross-language communication session, so the server 306 can distinguish the participating wireless communication devices 301 and 303 from other wireless communication devices handled by the server 306 and associate the participating wireless communication devices 301 and 303 with each other for the duration of the session.

In some embodiments, information about the users' session-initiation actions is sent to the server 306, and the server 306 selects the participating wireless communication devices 301 and 303, from among the wireless communication devices the server handles, based on a criterion that involves the participating devices 301 and 303. ("Based on" means based at least in part on, not necessarily based exclusively on. Furthermore, a criterion may include several criteria.) The server 306 then associates the selected wireless communication devices 301 and 303 with each other.

In some embodiments, the server 306 sends information to the associated wireless communication devices 301 and 303 sufficient to enable the devices 301 and 303 to communicate directly with each other. In other embodiments, the server 306 acts as an intermediary, and communications between the wireless communications devices 301 and 303 flow through the server 306. In yet other embodiments, the server 306 sends the information to another intermediary, such as a management server for the wireless communication network 309, and the intermediary establishes a communication channel between the wireless communication devices 301 and 303.

The criterion may include proximity in time of the users' session-initiation actions. For example, in some embodiments, the application program 312 or 315 sends a message to the server 306 when the application is launched or when the "Start" button is invoked. The message includes an identification of the wireless communication device 301 or 303, at least sufficient for the server 306 to communicate with the wireless communication device 301 or 303 and, in particular, with the application program 312 or 315. If the server 306 receives two messages from respective wireless communication devices 301 and 303, and both messages are received by the server 306 within a predetermined window of time, such as about 0.5 seconds or about 30 seconds, the server 306 may assume the respective users 318 and 321 attempted to approximately simultaneously perform session-initiation activities and, therefore, indicate willingness to participate in a cross-language communication session with each other.

Optionally or alternatively, the application programs 312 and 315 may include, in the messages, times at which the users' session-initiation actions occurred, and the server 306 may compare these times to ascertain if the users' actions occurred within the predetermined window of time and, therefore, indicate willingness to participate in a cross-language communication session. The server 306 may dynamically adjust the size of the time window, such as based on the number of wireless communication devices the server 306 is handling or based on the rate at which the server 306 is receiving messages from application programs to initiate sessions. For example, during times the server 306 is busy with many wireless communication devices or many messages, the server 306 may decrease the size of the time window, so as to decrease the likelihood of mistakenly associating two wireless communication devices with each other. Conversely, during less busy times, the server 306 may increase the size of the time window, so as to impose less stringent requirements of nearly simultaneous session-initiation actions by the users.

Many different user actions may be used to initiate a session. Many wireless communication devices 301 and 303 include accelerometers or gyroscopes or other sensors that enable the application programs 312 and 315 to ascertain orientation, movement or acceleration of the wireless communication devices 301 and 303. In one embodiment, the users indicate willingness to participate in a cross-language communication session by lightly bumping their devices 301 and 303 together. The application programs 312 and 315 detect movement prior to the bump, and then rapid deceleration at the time of the bump. Information about the users' activities, i.e., bumping, as well as the time of the bump, may be sent to the server 306. In embodiments that do not utilize a remote server to initiate the session, the bump may indicate to the respective application programs 312 and 315 willingness by the users 318 and 321 to participate in a session, and the application programs 312 and 315 may, in response, establish the session between the devices 301 and 303.

Other physical activities may be used and sensed to indicate willingness to participate in a session. Examples include: shaking or otherwise similarly moving the wireless communication devices 301 and 303 and similarly orienting the devices 301 and 303 or orienting the devices in a complementary manner.

Instead of, or in addition to, proximity in time, proximity in space may be used to ascertain whether two wireless communication devices 301 and 303 should be associated with each other and, therefore, participate in a cross-language communication session. Generally, users who wish to communicate with each other are located within unaided speaking distance of each other. Embodiments of the present invention may require users' wireless communication devices to be within such as distance of each other to establish a cross-language communication session between the devices. However, some embodiments may require smaller, such as on the order of centimeters, or allow greater distances, such as within unaided visible distance, of each other. Locations of the wireless devices 301 and 303 may be ascertained using global positioning system (GPS) data, location data provided by wireless communication networks (such as cell identification or cellular triangulation data) or WiFi hotspots, or any other suitable data or combination of data, for which methods for obtaining are well known in the art.

Proximity may also be inferred from network addresses of the wireless communication devices 301 and 303. For example, multiple wireless communication devices that concurrently access a common WiFi hotspot may all have identical Internet protocol (IP) addresses, because their communications are routed by a common router that employs network address translation (NAT). Thus, wireless communication devices that have identical IP address may be inferred to be proximate each other.

In some embodiments, wireless communication devices that are within a predetermined distance of each other are candidates for a session. The server 306 may receive location information from the wireless communication devices 301 and 303, such as from the application programs 312 and 315, or from the wireless communication network 309. In some embodiments, only wireless communication devices that are within a predetermined distance, such as about 1 meter or 10 meters or 100 meters, of each other when the session-initiation actions are performed are associated with each other for a session.

The server 306 may dynamically adjust the predetermined distance, based on proximity of other wireless mobile devices or on the number of wireless mobile devices that are proximate a wireless mobile device that has sent a session initiation message. If many wireless communication devices are located in a relatively small area, the server 306 may reduce the predetermined distance, and if few wireless communication devices are located in the area, the server 306 may increase the predetermined distance.

In some embodiments, the criterion used to select wireless communication devices for participation in a cross-language communication session includes similarity of at least a portion of network addresses of the wireless communication devices. For example, two network addresses may be similar to each other, because they both begin with identical digits, indicating identical network prefixes.

Other criteria include similarity of sounds, images or video sequences captured by the respective wireless communication devices 301 and 303. "Similarity" means identical or identical within a tolerance or meeting some similarity criterion. Most wireless communication devices include microphones. In some embodiments, each application program 312 and 315 records a short audio signal of ambient sounds and sends the audio signal to the server 306, and the server 306 compares the audio signals for similarity, within a predefined tolerance, such as may be measured using mel-frequency cepstrum (MFC) analysis. Wireless communication devices in relatively close proximity of each other are likely to receive similar or identical ambient sounds. It should be noted that sounds captured by two spaced-apart communication devices may be similar, although time-shifted, with respect to each other.

In other embodiments, digitized images or video sequences captured by the wireless communication devices 301 and 303 may be compared by the server 306 for similarity to each other, as determined using various well-known image or video similarity metrics. In these embodiments, the users 318 and 321 may aim cameras in their respective wireless communication devices 301 and 303 at a common scene to indicate willingness to participate in a cross-language communication session. Physical properties, such as strength of the gravitational field at the wireless communication devices 301 and 303 may also be compared. The server 306 may use a combination of the techniques disclosed herein, or other techniques, to infer appropriateness of the wireless communication devices to be associated with each other.

If the wireless communication devices 301 and 303 include short-range wireless communication capabilities, such as Bluetooth transceivers, information obtained from these transceivers when the devices 301 and 303 come within range of each other may be used to infer physical proximity of the devices 301 and 303.

Furthermore, Bluetooth and other technologies enable devices to advertise services the devices provide, such as by using service discovery protocol (SDP). Each service is identified by a universal unique identifier (UUID). An appropriate UUID may be allocated for cross-language communication service. In some embodiments, the application programs 312 and 315 advertise cross-language communication service. The advertisements may include the respective users' preferred languages. When two such suitably equipped and enabled wireless communication devices are within range of each other, the application programs 312 and 315 may be configured to automatically alert the respective users 318 and 321 of the availability of a potential participant in a cross-language communication session, such as by sounding an alarm or activating a vibrator in the communication device. The alert may depend on whether the potential participant speaks a language (such as the local language) selected by the user of the other wireless communication device.

Thus, the wireless communication devices 301 and 303, or more specifically the application programs 312 and 315, may automatically discover each other and prompt one or both the respective users 318 and 312. In response to the prompt(s), the user(s) may indicate willingness to participate in a cross-language communication session. Such an embodiment need not necessarily employ a server to associate the wireless communication devices 301 and 303 with each other.

Although it may be desirable to avoid disclosing network addresses or telephone numbers of the wireless communication device 301 to the user 321 of the other device 303, the application program 312 may be configured to display a random, pseudo-random, arbitrary or predefined number or other string that may be disclosed to the user 321 of the other wireless communication device 303 as a temporary identification. The user 321 of the other wireless communication device 303 may then enter the temporary identification into the application program 315 to indicate willingness to participate in a cross-language communication session with the user 318 of the first wireless communication device 301. In embodiments that involve a server 306 for associating wireless communication devices with each other, the application programs 312 and 315 send any such entered temporary identifications to the server 306. The server 306 then uses the received temporary identifications to associate the corresponding wireless communication devices 301 and 303 with each other.

Regardless of whether the wireless communication devices 301 and 303 are associated with each other by the server 306 or solely by the application programs 312 and 315, once the devices 301 and 303 are associated with each other, the cross-language communication session is established. As noted, the associated wireless communication devices 301 and 303 communicate with each other, either directly or via an intermediary, such as an intermediary in the wireless network 309 or the server 306.

Once a cross-language communication session is established between the wireless communication devices 301 and 303, the users 318 and 321 may enter text into their respective devices, and translated versions of the text is output on the other user's device. The translation may be performed on the wireless communication device on which the text was entered, on the server 306, another server (not shown) or on the wireless communication device of the other user. Thus, the entered text or the translated version of the translated text is sent wirelessly to the wireless communication device of the other user, either directly or via an intermediary, such as the server 306 or an intermediary in the wireless communication network 309. The users 318 and 321 can continue entering text into their respective wireless communication devices 301 and 303, and translated versions of the text are displayed on the other user's device.

The translation of each user's input (message) may be performed after each user indicates her input is complete. For example, the user may press a "Translate" button or a "Return" key on the user interface provided by the application program to signal the end of a message. In this manner, the user may make corrections to her input, such as by deleting text or inserting text, before the input text is translated. All the users may enter text simultaneously or in an overlapping manner in their respective wireless communication devices, and the translations may be performed as each user indicates completeness of her input. Thus, more than one translation may occur at a time. Furthermore, each user may input several messages in sequence, and these messages may be translated in sequence. The users' inputs may be interleaved, such as a result of a conversation between the users, each entering a message in turn, all during a single cross-language communication session.

Optionally or alternatively, the translation and display of the translated text may be performed as each word or sentence is entered, without necessarily requiring the user to invoke a "Translate" button or the like. In this case, as a user types and possibly revises text, translated and possibly revised translated text is displayed on the other user's wireless communication device. Depending on the language in which the user enters text and the language into which the entered text is being translated, the translator may delay generating translated text until sufficient input text (such as a verb near the end of a German sentence) has been entered. Optionally or alternatively, the translator may generate refined translations as the user enters text, and the refined translations may be displayed on the other user's wireless communication device, such as by deleting an earlier translation of a partial sentence and displaying the refined translation. Semantic and grammar prediction acquired through machine learning (ML) methods may be used to deal with ambiguities in a user's partial inputs to improve the translations. Thus, the system may provide essentially real-time translation of user inputs.

As used herein, a "message" or a "user message entered on the first wireless communication device in a first natural language" means a unit of text that is to be translated. In some embodiments, the user indicates the end of a message, while in other embodiments the system automatically determines the extent of each message, such as at the end of each word, sentence or other group of text.

The cross-language communication session may be ended when either user 318 or 321 activates an "End" button on a user interface displayed by the application program 312 or 315. Optionally or alternatively, the cross-language communication session may be ended when either wireless communication device 301 or 303 is no longer proximate the other device. Lack of proximity may be automatically determined, such as by the server 306 or by either application program 312 or 315, by distance between the wireless communication devices 301 and 303, as discussed above. Optionally or alternatively, lack of proximity may be determined by loss or degradation of the wireless signal from one of the wireless communication devices 301 or 303.

Figure 4:
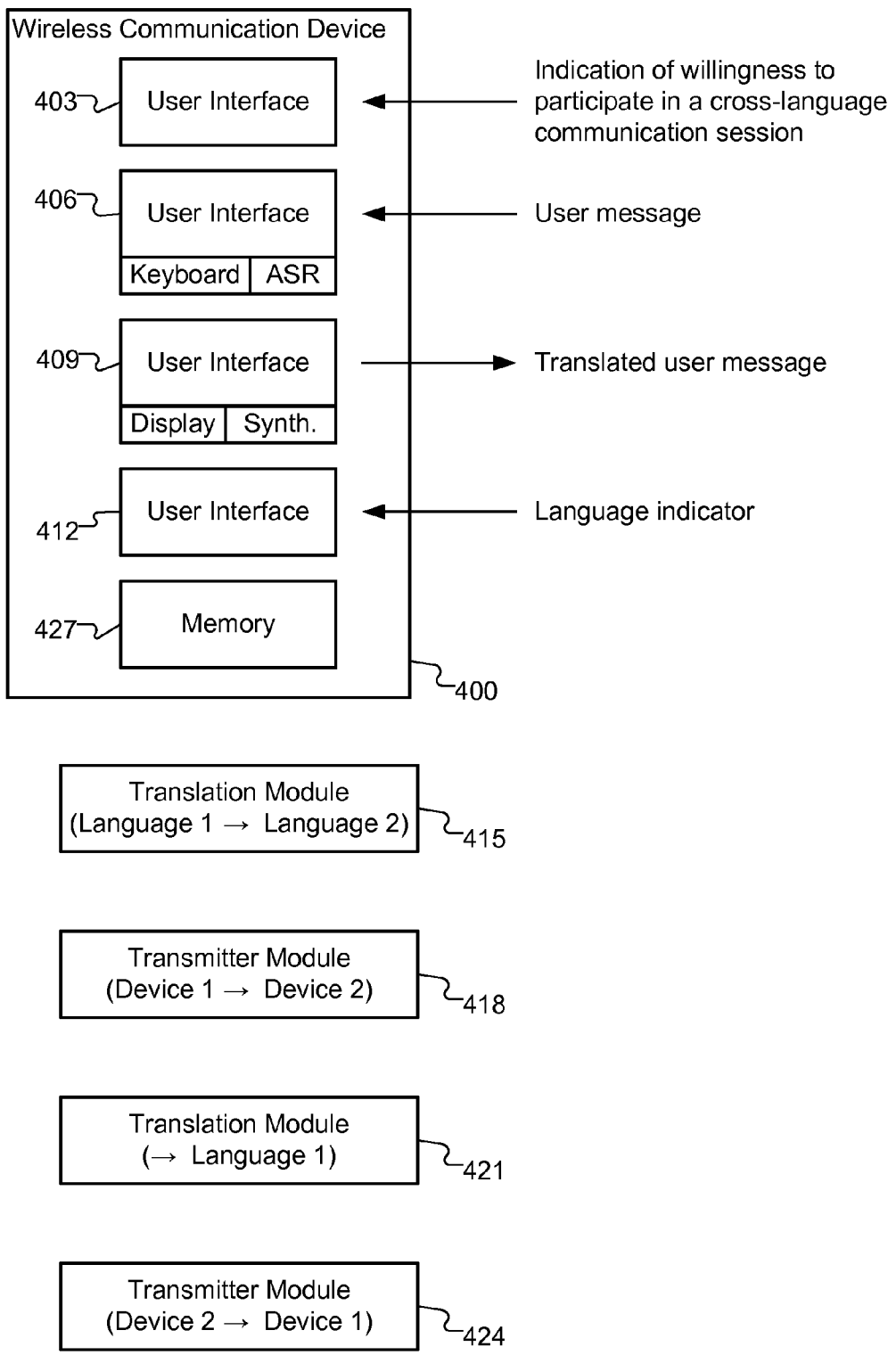
FIG. 4 is a schematic block diagram of an embodiment of the present invention.

FIG. 4 is a schematic block diagram of an embodiment of the present invention. A wireless communication device 400 (such as one of the wireless communication devices 301 or 303 of FIG. 3) includes four user interfaces 403, 406, 409 and 412. The first user interface 403 is configured to receive a user input indicating willingness to participate in a cross-language communication session with another wireless communication device. As noted, to preserve privacy of the users, the identity of the other wireless communication device or user may not be known or made available. Thus, "with another wireless communication device" does not necessarily require the identity of the other device to be entered via the first user interface 403. The first user interface 403 may be implemented by a real or virtual button, accelerometer or other hardware or software device or combination thereof.

The second user interface 406 is configured to receive a user message, such as text entered via a real or virtual keyboard, microphone and automatic speech recognizer, etc. The third user interface 409 is configured to output a translated user message, such as via a display screen or speech synthesizer.

The embodiment includes a first automatic translation module 415 configured to generate the translated user message that is output by the third user interface 406. The first translation module 415 translates a user message received by one of the wireless communication devices from a first natural language, such as French, to a second natural language, such as English. In some embodiments, the first translation module 415 is within one of the wireless communication devices, such as device 301 (FIG. 3). In other embodiments, the first translation module 415 is with another of the wireless communication devices, such as device 303 (FIG. 3). In yet other embodiments, the first translation module 415 is within a server 306 (FIG. 3).

FIG. 1 also shows a first transmitter module 418 configured to wirelessly send the user message received by the first wireless communication device, or the translated user message, from the first wireless communication device to the second wireless communication device. In some embodiments, such as embodiments that involve direct wireless communication between the two wireless communication devices, the first transmitter module 418 is within the first wireless communication device 301 (FIG. 3). In some other embodiments, such as embodiments in which communications between the wireless communication devices travels via a wireless communication network or a server, the first transmitter module 418 may be within the first wireless communication device or within the wireless communication network or server.

A second automatic translation module 421 is configured to generate a second translated user message by translating a user message received by the second wireless communication device 303 (FIG. 1) to the first natural language. The second automatic translation module 421 may be within the first or second wireless communication device 301 or 303 (FIG. 3) or within the server 306.

A second transmitter module 424 is configured to wirelessly send the user message received by the second wireless communication device 303 (FIG. 1), or the second translated user message, from the second wireless communication device to the first wireless communication device. In some embodiments, such as embodiments that involve direct wireless communication between the two wireless communication devices, the second transmitter module 424 is within the second wireless communication device 303 (FIG. 3). In some other embodiments, such as embodiments in which communications between the wireless communication devices travels via a wireless communication network or a server, the second transmitter module 424 may be within the second wireless communication device or within the wireless communication network or server.

The fourth user interface 412 is configured to receive an identification of the first natural language, i.e., the user's preferred language. The application program (not shown) stores an indication of the first natural language in a memory 427.

Figure 5:
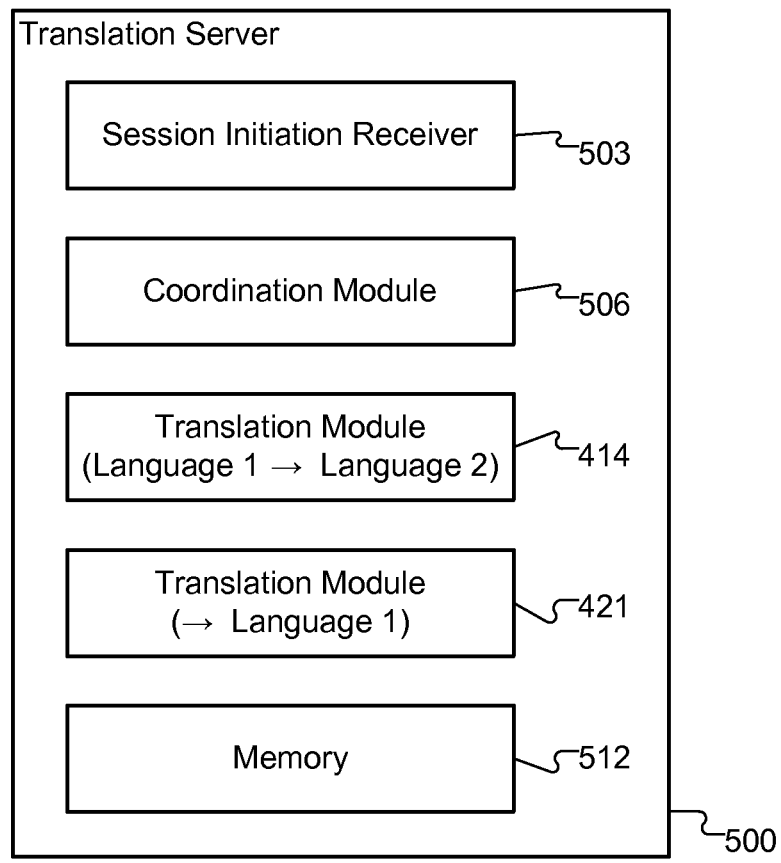
FIG. 5 is a schematic block diagram of another embodiment of the present invention.

FIG. 5 is a schematic block diagram of another embodiment of the present invention. A server 500 (such as the server 306 of FIG. 3) is configured to automatically coordinate establishment of a cross-language communication session that includes two or more wireless communication devices. The server 500 includes a session initiation receiver 503 configured to receive information about user inputs received by respective ones of the wireless communication devices. The user inputs indicate willingness to participate in the cross-language communication session. A coordination module 506 is configured to automatically associate the wireless communication devices (of a session) with each other. The coordination module 506 may be configured to select the wireless communication devices for a session, from among a plurality of wireless communication devices, based on a criterion that involves the wireless communication devices. The selected wireless communication devices are associated with each other. The criterion may include physical proximity of the wireless communication devices to each other. Other possible criteria are discussed elsewhere herein.

As noted above, with respect to FIG. 4, the first and/or second translation modules 414 and/or 421 may be included in the server 500. Furthermore, the server 500 may include a memory 512, and the server 500 may store indications of the language preferences of the users, instead of or in addition to storing these indications in respective memories of the wireless communication devices.

Figure 6:
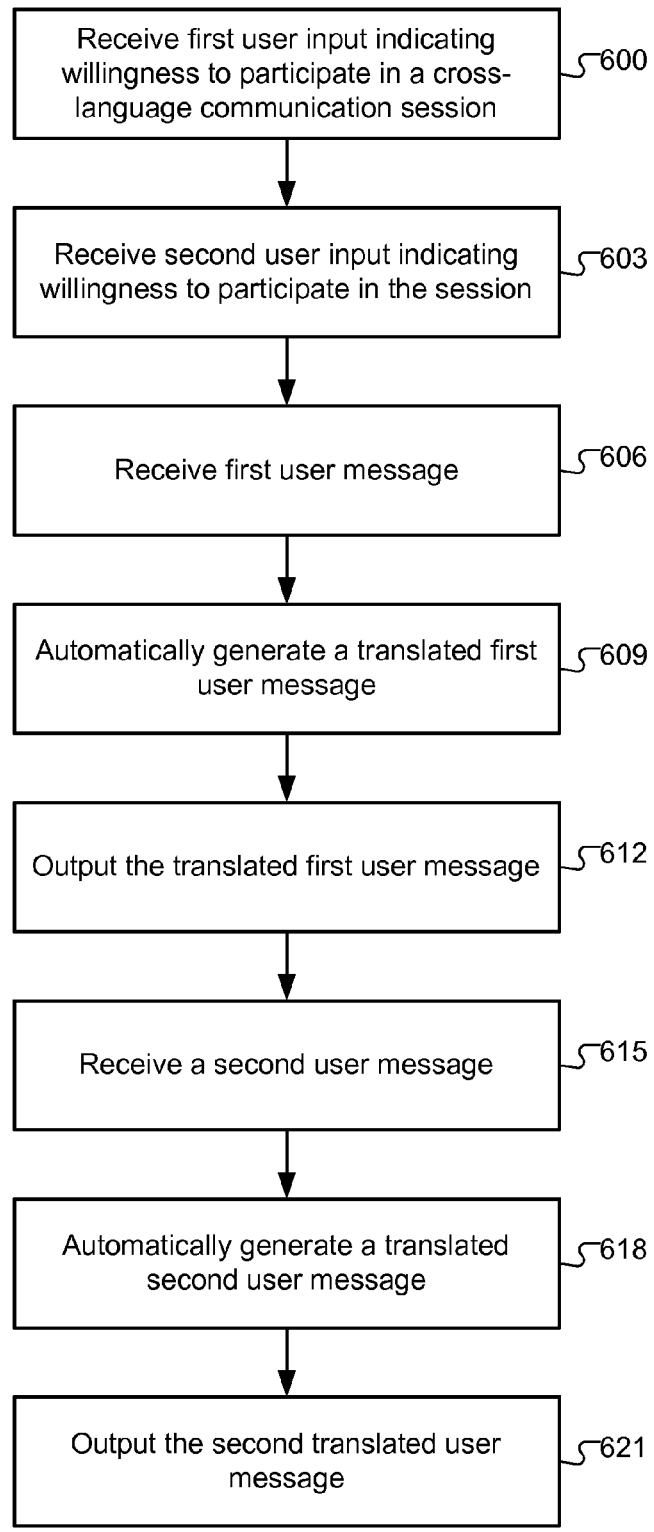
FIG. 6 contains a flowchart illustrating operation of an embodiment of the present invention.

FIG. 6 contains a flowchart illustrating operation of an embodiment of the present invention. At 600, a first user input indicating willingness to participate in a cross-language communication session with a second wireless communication device is received at a first wireless communication device. At 603, a second user input indicating willingness to participate in the cross-language communication session with the first wireless communication device is received at the second wireless communication device. At 606, after receiving the first and second user inputs, a first user message entered on the first wireless communication device in a first natural language is received. It should be noted that the first user message is entered on the first wireless communication device, not received by the first wireless communication device from some other device, ex. an SMS message. At 609, a translated first user message is automatically generated, including translating the first user message into a second natural language, different than the first natural language. The translation may be performed on the first or second wireless communication device. Optionally or alternatively, a request may be sent to a server, distinct from the first and second wireless communication devices, to translate the first user message, and a translation of the first user message into the second natural language may be received from the server. At 612, the translated first user message is output on the second wireless communication device.

The cross-language communication session may optionally be continued. At 615, after outputting the translated first user message on the second wireless communication device, a second user message, entered on the second wireless communication device, is received. At 618, a translated second user message is automatically generated, including translating the second user message into the first natural language. At 621, the translated second user message is output on the first wireless communication device.

While the invention is described through the above-described exemplary embodiments, modifications to, and variations of, the illustrated embodiments may be made without departing from the inventive concepts disclosed herein. Furthermore, disclosed aspects, or portions thereof, may be combined in ways not listed above and/or not explicitly claimed. Accordingly, the invention should not be viewed as being limited to the disclosed embodiments.

Although aspects of embodiments may be described with reference to flowcharts and/or block diagrams, functions, operations, decisions, etc. of all or a portion of each block, or a combination of blocks, may be combined, separated into separate operations or performed in other orders. All or a portion of each block, or a combination of blocks, may be implemented as computer program instructions (such as software), hardware (such as combinatorial logic, Application Specific Integrated Circuits (ASICs), Field-Programmable Gate Arrays (FPGAs) or other hardware), firmware or combinations thereof. Embodiments may be implemented by a processor executing, or controlled by, instructions stored in a memory. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable storage media (e.g., read-only memory devices within a computer, such as ROM, or devices readable by a computer I/O attachment, such as CD-ROM or DVD disks), information alterably stored on tangible writable storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

What is claimed is:

1. A computer-implemented method for facilitating cross-language communication among users of respective wireless communication devices, the method comprising:
   receiving, at a first of the wireless communication devices, a first user input indicating willingness to participate in a cross-language communication session with a second of the wireless communication devices;
   receiving, at the second wireless communication device, a second user input indicating willingness to participate in the cross-language communication session with the first wireless communication device;
   receiving, at the first wireless communication device, a first signal from a first sensor of the first wireless communication device, other than an antenna;
   receiving, at the second wireless communication device, a second signal from a second sensor of the second wireless communication device, other than an antenna;
   automatically comparing the first signal to the second signal to determine whether the first signal and the second signal satisfy a similarity criterion;
   if the first and second signals satisfy the similarity criterion, automatically establishing the cross-language communication session; and if the cross-language communication session is established:
after receiving the first and second user inputs, receiving a first user message entered on the first wireless communication device in a first natural language;
automatically generating a translated first user message, including translating the first user message into a second natural language, different than the first natural language; and
outputting the translated first user message on the second wireless communication device.

2. A method according to claim 1, further comprising, as part of the cross-language communication session:
after outputting the translated first user message on the second wireless communication device, receiving a second user message entered on the second wireless communication device;
automatically generating a translated second user message, including translating the second user message into the first natural language; and
outputting the translated second user message on the first wireless communication device.

3. A method according to claim 1, further comprising, during the cross-language communication session:
receiving subsequent first user messages entered on the first wireless communication device;
for each subsequent first user message:
automatically generating a corresponding translated first user message, including translating the subsequent first user message into the second natural language; and
outputting the corresponding translated first user message on the second wireless communication device;
receiving subsequent second user messages entered on the second wireless communication device; and
for each subsequent second user message:
automatically generating a corresponding translated second user message, including translating the subsequent second user message into the first natural language; and
outputting the corresponding translated second user message on the first wireless communication device.

4. A method according to claim 1, wherein automatically generating the translated first user message comprises translating the first user message into the second natural language within the first wireless communication device.

5. A method according to claim 1, wherein automatically generating the translated first user message comprises translating the first user message into the second natural language within the second wireless communication device.

6. A method according to claim 1, wherein automatically generating the translated first user message comprises:
sending a request to a server, distinct from the first and second wireless communication devices, to translate the first user message; and
receiving, from the server, a translation of the first user message into the second natural language.

7. A method according to claim 1, further comprising:
before receiving the first and second user inputs indicating willingness to participate in the cross-language communication session, receiving, by at least one of the first and second wireless communication device, a user input identifying the first natural language; and
responsive to receiving the user input identifying the first natural language, storing, by at least one of the first and second wireless communication device, an indication of the first natural language.

8. A method according to claim 1, further comprising wirelessly communicating at least one of the first user message and the translated first user message from the first wireless communication device directly to the second wireless communication device.

9. A method according to claim 1, further comprising:
wirelessly communicating at least one of the first user message and the translated first user message from the first wireless communication device, via a wireless communication network, to the second wireless communication device; and
wherein generating the translated first user message occurs within at least one of the first and second wireless communication devices.

10. A method according to claim 1, further comprising automatically coordinating establishment of the cross-language communication session by a server, distinct from and wirelessly communicatively coupled to the first and second wireless communication devices, including:
receiving, at the server, information about the first and second user inputs indicating willingness to participate in the cross-language communication session; and
automatically associating the first wireless communication device with the second wireless communication device, based on the similarity of the first and second signals.

11. A method according to claim 10, wherein associating the first with the second wireless communication device comprises automatically selecting the first and second wireless communication devices from among a plurality of wireless communication devices, based on the similarity of the first and second signals.

12. A method according to claim 11, wherein automatically establishing the cross-language communication session comprises establishing the cross-language communication session only if a distance between the first and second wireless communication devices is less than a threshold value.

13. A method according to claim 12, further comprising automatically calculating the threshold value, based on a number of wireless communication devices physically proximate the first wireless communication device.

14. A method according to claim 11, wherein automatically establishing the cross-language communication session comprises establishing the cross-language communication session only if at least a portion of a network addresses of the first wireless communication device is similar to at least a portion of a network address of the second wireless communication devices.

15. A method according to claim 11, wherein:
receiving the first signal comprises receiving an ambient sound signal from a microphone of the first wireless communication device; and
receiving the second signal comprises receiving an ambient sound signal from a microphone of the second wireless communication device.

16. A method according to claim 11, wherein:
receiving the first signal comprises receiving an image signal from a camera of the first wireless communication device; and
receiving the second signal comprises receiving an image signal from a camera of the second wireless communication device.

17. A method according to claim 11, wherein:
receiving the first signal comprises receiving an acceleration signal from an accelerometer of the first wireless communication device; and receiving the second signal comprises receiving an acceleration signal from an accelerometer of the second wireless communication device.

18. A method according to claim 10, further comprising:
receiving, at the first wireless communication device, a third user input including information about the second wireless communication device; and wherein
associating the first with the second wireless communication device comprises associating the first with the second wireless communication device, based on the received information about the second wireless communication device.

19. A method according to claim 10, wherein automatically generating the translated first user message comprises translating the first user message into the second natural language by the server.

20. A method according to claim 1, wherein automatically establishing the cross-language communication session comprises establishing the cross-language communication session only if the first wireless communication device is physically proximate the second wireless communication device.

21. A method according to claim 1, further comprising:
recording a time at which the first signal is received;
recording a time at which the second signal is received; and wherein:
automatically establishing the cross-language communication session comprises establishing the cross-language communication session only if the first and second signals are respectively received by the first and second wireless communication devices within a predetermined amount of time.

22. A method according to claim 1, wherein the first and second signals indicate the first wireless communication device and the second wireless communication device are similarly oriented.

23. A method according to claim 1, wherein first and second signals indicate the first wireless communication device and the second wireless communication device have collided with each other.

24. A method according to claim 1, wherein:
receiving the first signal comprises receiving an ambient sound signal from a microphone of the first wireless communication device; and
receiving the second signal comprises receiving an ambient sound signal from a microphone of the second wireless communication device.

25. A method according to claim 1, wherein:
receiving the first signal comprises receiving an image signal from a camera of the first wireless communication device; and
receiving the second signal comprises receiving an image signal from a camera of the second wireless communication device.

26. A method according to claim 1, wherein:
receiving the first signal comprises receiving an accelerometer signal from an accelerometer of the first wireless communication device; and
receiving the second signal comprises receiving an accelerometer signal from an accelerometer of the second wireless communication device.

27. A method according to claim 1, wherein comparing the first signal to the second signal and automatically establishing the cross-language communication session are performed without revealing to either of the users private information about the other user and without revealing private information to either of the users about the other user's wireless communication device.

28. A method according to claim 1, wherein comparing the first signal to the second signal and automatically establishing the cross-language communication session are performed:
leaving no permanent information in either of the wireless communication devices about the user of the other wireless communication device; and
leaving no permanent information in either of the wireless communication devices about the other wireless communication device;
such that, once the cross-language communication session ends, no further cross-language communication between the wireless communication devices is possible, without establishing another cross-language communication session.

29. A method according to claim 1, wherein comparing the first signal to the second signal and automatically establishing the cross-language communication session are performed such that each user's privacy is preserved.

30. A system for facilitating cross-language communication among users of respective wireless communication devices, the system comprising:
first and second wireless communication devices, each wireless communication device including a respective:
first user interface configured to receive a respective user input indicating willingness to participate in a cross-language communication session with the other wireless communication device;
second user interface configured to receive a respective user message, after receipt of the user inputs indicating willingness to participate in the cross-language communication session;
third user interface configured to output a respective translated user message; and
sensor, other than an antenna, configured to receive an ambient signal;
a coordination module configured to automatically:
compare the first signal to the second signal to determine whether the first signal and the second signal satisfy a similarity criterion; and
if the first and second signals satisfy the similarity criterion, establish the cross-language communication session;
a first automatic translation module configured, if the cross-language communication session is established, to generate the translated user message by translating the user message received by the first wireless communication device from a first natural language to a second natural language; and
a first transmitter module configured, if the cross-language communication session is established, to wirelessly send, from the first wireless communication device to the second wireless communication device, at least one of the user message received by the first wireless communication device and the translated user message.

31. A system according to claim 30, wherein the coordination module is configured automatically compare the first signal to the second signal to determine whether the first signal and the second signal satisfy a similarity criterion and automatically establish the cross-language communication session, all without revealing to either of the users private information about the other user and without revealing private information to either of the users about the other user's wireless communication device.

32. A system according to claim 30, wherein the coordination module is configured automatically compare the first signal to the second signal to determine whether the first signal and the second signal satisfy a similarity criterion and automatically establish the cross-language communication session, all while leaving no permanent information in either of the wireless communication devices about the user of the other wireless communication device and leaving no permanent information in either of the wireless communication devices about the other wireless communication device, such that, once the cross-language communication session ends, no further cross-language communication between the wireless communication devices is possible, without establishing another cross-language communication session.

33. A system according to claim 30, wherein the coordination module is configured automatically compare the first signal to the second signal to determine whether the first signal and the second signal satisfy a similarity criterion and automatically establish the cross-language communication session, such that each user's privacy is preserved.

34. A system for facilitating cross-language communication among users of respective first and second wireless communication devices, the first wireless communication device having a first sensor, other than an antenna, configured to receive a first signal from an ambient signal source and the second wireless communication device having a second sensor, other than an antenna, configured to receive a second signal from an ambient signal source, the system comprising:
  a server configured to automatically coordinate establishment of a cross-language communication session including the first and second wireless communication devices, the server including:
    a session initiation receiver configured to receive information about first and second user inputs, received by the respective first and second wireless communication devices, indicating willingness to participate in the cross-language communication session; and
    a coordination module configured to automatically:
      compare the first signal to the second signal to determine whether the first signal and the second signal satisfy a similarity criterion; and
      if the first and second signals satisfy the similarity criterion, associate the first wireless communication device with the second wireless communication device.

35. A system according to claim 34, wherein the coordination module is configured to select the first and second wireless communication devices from among a plurality of wireless communication devices, based on similarity of the first and second signals, to associate the first wireless communication device with the second wireless communication device.

36. A system according to claim 35, wherein the coordination module is configured to select the first and second wireless communication devices from among a plurality of wireless communication devices, based on physical proximity of the first wireless communication device to the second wireless communication device.

37. A system according to claim 34, wherein the coordination module is configured automatically compare the first signal to the second signal to determine whether the first signal and the second signal satisfy a similarity criterion and automatically establish the cross-language communication session, all without revealing to either of the users private information about the other user and without revealing private information to either of the users about the other user's wireless communication device.

38. A system according to claim 34, wherein the coordination module is configured automatically compare the first signal to the second signal to determine whether the first signal and the second signal satisfy a similarity criterion and automatically establish the cross-language communication session, all while leaving no permanent information in either of the wireless communication devices about the user of the other wireless communication device and leaving no permanent information in either of the wireless communication devices about the other wireless communication device, such that, once the cross-language communication session ends, no further cross-language communication between the wireless communication devices is possible, without establishing another cross-language communication session.

39. A system according to claim 34, wherein the coordination module is configured automatically compare the first signal to the second signal to determine whether the first signal and the second signal satisfy a similarity criterion and automatically establish the cross-language communication session, such that each user's privacy is preserved.

40. A computer program product for facilitating cross-language communication among users of respective wireless communication devices, the computer program product comprising a non-transitory computer-readable medium having computer readable program code stored thereon, the computer readable program code configured to:
  receive, at a first of the wireless communication devices, a first user input indicating willingness to participate in a cross-language communication session with a second of the wireless communication devices;
  receive, at the second wireless communication device, a second user input indicating willingness to participate in the cross-language communication session with the first wireless communication device;
  receive, at the first wireless communication device, a first signal from a first sensor of the first wireless communication device, other than an antenna;
  receive, at the second wireless communication device, a second signal from a second sensor of the second wireless communication device, other than an antenna;
  automatically compare the first signal to the second signal to determine whether the first signal and the second signal satisfy a similarity criterion;
  if the first and second signals satisfy the similarity criterion, automatically establish the cross-language communication session; and
  if the cross-language communication session is established:
    after receiving the first and second user inputs, receive a first user message entered on the first wireless communication device in a first natural language;
    automatically generate a translated first user message, including translating the first user message into a second natural language, different than the first natural language; and
    output the translated first user message on the second wireless communication device.

\* \* \* \* \*